United States Patent [19]

't Hoen

[11] Patent Number: 4,574,635

[45] Date of Patent: Mar. 11, 1986

[54] MONITORING OF FREQUENCY SHIFT OF ULTRASOUND PULSES IN TISSUE

[75] Inventor: Pieter J. 't Hoen, Mission Viejo, Calif.

[73] Assignee: North American Philips Corporation, New York, N.Y.

[21] Appl. No.: 667,925

[22] Filed: Nov. 2, 1984

[51] Int. Cl.$^4$ .............................................. G01N 29/00
[52] U.S. Cl. .................................... 73/599; 73/602; 128/660
[58] Field of Search ..................... 73/599, 600, 602; 128/660

[56] References Cited

U.S. PATENT DOCUMENTS

| 4,016,750 | 4/1977 | Green | 73/599 |
| 4,441,368 | 4/1984 | Flax | 128/660 |
| 4,442,713 | 4/1984 | Wilson | 73/599 |
| 4,475,397 | 10/1984 | Riley | 73/599 |
| 4,509,524 | 4/1985 | Miwa | 73/599 |
| 4,515,163 | 5/1985 | Flax | 73/599 |
| 4,534,221 | 8/1985 | Fife et al. | 73/599 |
| 4,534,359 | 8/1985 | Miller-Jones | 73/599 |

*Primary Examiner*—Howard A. Birmiel
*Attorney, Agent, or Firm*—Jack E. Haken

[57] ABSTRACT

A zero crossing detection circuit for estimating the ultrasonic attenuation in a region of interest in the body from an A-line signal which is representative of pulses of ultrasound energy reflected from said region. The ultrasound attenuation is estimated from the center frequency $f_Z$ of the returned energy which is calculated from the formula:

$$f_Z = \frac{n \cdot V_{ref}}{2 \int V_u(t) dt}$$

as measured at various depths in the body.

3 Claims, 5 Drawing Figures

MONITORING OF FREQUENCY SHIFT OF ULTRASOUND PULSES IN TISSUE

The invention relates to apparatus for determining the apparent frequency of ultrasound echoes which are returned from tissue in a region-of-interest within a body. The apparatus allows the estimation of the mean ultrasound attenuation in the tissue by analysis of apparent frequency as a function of depth.

BACKGROUND OF THE INVENTION

Echo ultrasound is a known technology for determining the location of and for generating images from discontinuities in the value of the acoustic impedance within objects. In a typical diagnostic imaging system, a periodic train of pulses of ultrasound energy is directed into the body. Energy from the pulses is reflected from impedance discontinuities, which may occur at organ boundaries or at lesions within otherwise healthy, homogeneous tissue.

The amplitude of echoes which have reflected from the body may be plotted as a function of time to produce a A-line which represents the magnitude of impedance discontinuities at various distances along the ultrasound propagation path. If the propagation path is scanned across the body, the resultant A-lines may be combined on a two-dimensional display to produce an image of the interior of the body.

Ultrasound energy is attenuated as it passes through tissue. The magnitude of the attenuation in a local region of the body may be used to characterize the type and condition of tissue in that region and may be used, for example, to differentiate between various organs or between healthy and diseased tissue.

The ultrasonic attenuation of animal tissue is known to vary as a function of frequency and, as a result, the center frequency of a wideband ultrasound pulse will appear to shift as a function of both the tissue type and the length of the propagation path through the tissue. The apparent shift in the center frequency of ultrasound pulses reflected from a region of tissue may be used to estimate the attenuation of that tissue in a manner which is described in *Ultrasonic Attenuation Tomography of Soft Tissues*, Dines and Kak, Ultrasonic Imaging Vol. 1, No. 1, pages 16-33, 1979.

Apparatus which estimates the attenuation of tissue by counting zero crossings of the signal in an A-line is described, for example, in U.S. Pat. No. 4,441,368 to Flax. The apparatus described in the Flax patent is, however, sensitive to drop-outs or reductions in the amplitude of the A-line signal which may, for example, occur when ultrasound propagates through a cyst and the resultant measurements of attenuation may be inaccurate or confusing when made in the vicinity of cysts.

SUMMARY OF THE INVENTION

The invention is an improved apparatus and method for measuring the apparent frequency shift of ultrasound echoes.

Ultrasound energy is attenuated as it passes through tissue. The magnitude of the attenuation in a local region of the body may be used to characterize the type and condition of crossings of an A-line signal. A hard limiter clamps the level of positive regions of the A-line signal to a reference voltage. The resultant square pulse train is integrated and the integral value divided, on a running, real-time basis, by the number of pulses in the train. The quotient is then a measure of the apparent mean center frequency of the pulse echoes and is not distorted by drop-outs of the A-line signal which may occur during propagation through a cyst.

THE DRAWINGS

The method and apparatus of the invention can be best understood by reference to the drawings in which.

A PREFERRED EMBODIMENT

Figure 1:
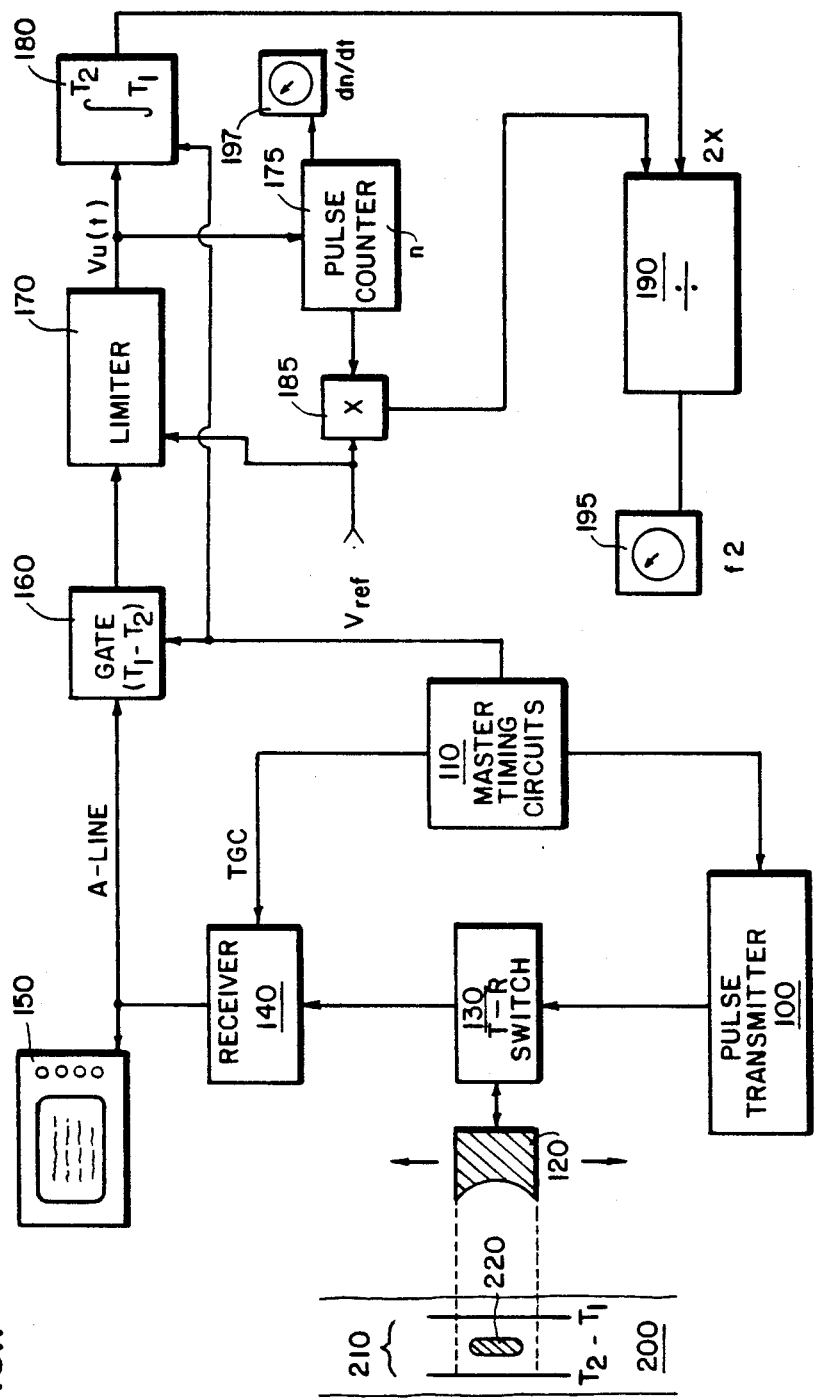
FIG. 1 is a schematic drawing of a preferred embodiment of apparatus implementing the invention.

Referring to FIG. 1, a conventional medical ultrasound pulse transmitter 100 operates, in response to signals from master timing circuits 110, to drive an ultrasound transducer 120 through a TR switch 130 and to thus direct a periodic series of ultrasound pulses from the transducer 120 into a body 200. The ultrasound energy propagates through tissue in the body 200 where it is attenuated and partially reflected from impedance discontinuities. A portion of the reflected energy is returned, as echoes, to the transducer 120 where it is converted into electrical signals and directed through the TR switch 130 to an ultrasound receiver 140. The time between transmission of an ultrasound pulse and the detection of a specific echo by the transducer 120 is a direct measure of the distance between the transducer and the feature in the body which produced that echo. Thus, any echoes which occur in the interval between times $T_1$ and $T_2$ after the transmission of a pulse may be attributed to impedance discontinuities in a region-of-interest 210 within the body.

Figure 2:
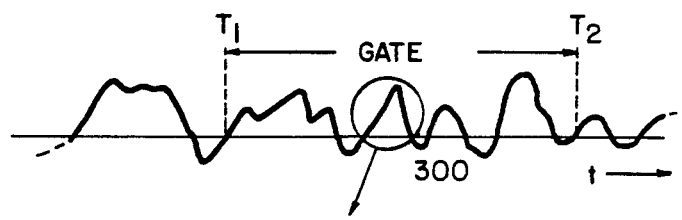
FIG. 2 represents a typical A-line signal.

The receiver 140 amplifies the echo signals in accordance with a gain function which is controlled by a time gain compensation (TGC) signal generated by the master timing circuits 110 to compensate for the greater attenuation which is experienced by pulses which travel longer distances through tissue. The output of the receiver is an A-line signal which can be displayed on a CRT 150 using well known techniques, to produce an image of the interior of the body. FIG. 2 represents a typical portion of an A-line signal thus generated.

The A-line signal is applied to a gate 160 which is controlled by a pair of timing pulses $T_1$ and $T_2$ so that it passes only that portion of the A-line signal representative of echoes generated within the region-of-interest 210. FIG. 2 is an enlarged view of a portion of the A-line signal within the gate interval which is designated by the circle 300 in FIG. 2. The interval $\Delta_t$ between the positive going and negative going zero crossings of the A-line is a measure of the instantaneous center frequency of the returned echo signal and, in a known manner, may be used to estimate the attenuation within the region-of-interest.

Figure 3:
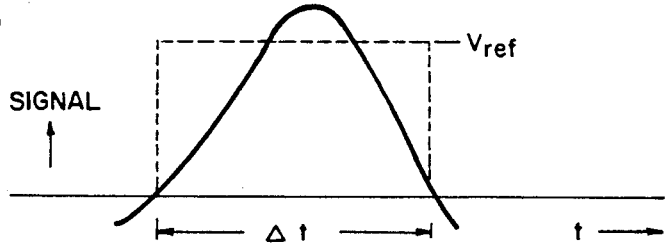
FIG. 3 is an enlarged drawing of the region indicated by the circle in FIG. 1.
Figure 4:
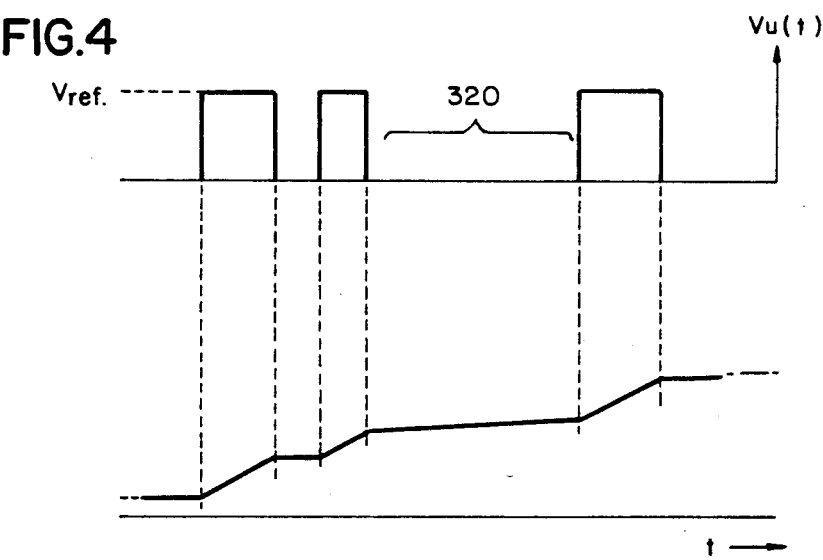
FIG. 4 illustrates a signal produced by hard limiting positive regions of an A-line signal and subsequently integrating the limited pulse train.

The output of the gate 160, which is the portion of the A-line signal originating within the region-of-interest 210, is applied to the input of a hard limiting circuit 170 which clamps positive regions of the A-line signal to a reference level $V_{ref}$ and negative regions of the A-line signal to ground level. The output of the limiter is indicated by the dashed line in FIG. 3 and by the representative pulse train $V_u(t)$ in upper plot of FIG. 4. The region 320 in FIG. 4 represents a drop-out in the A-line of the type which may result, for example, from ultrasound propagation through a cyst (indicated as region 220 in FIG. 1).

The output of the limiter 170 is integrated, in an integrator circuit 180. The output of the integrator 180 is indicated as the lower plot of FIG. 4.

The output of the limiter 170 is also applied to a pulse counter 175. The output of the pulse counter is multiplied by the value of $V_{ref}$ in a multiplier 185. The output of the multiplier 185 is divided by the output of the integrator 180 in a divider circuit 190. The quotient output of the divider 190 is proportional to the apparent center frequency $f_Z$ of the energy returned from the region of interest and is indicated on a display 195. The pulse rate $dn/dt$ at the output of the pulse counter is likewise indicated on a display 197.

The circuit of FIG. 1 calculates the center frequency of the returned energy in the region of interest $f_Z$ from the formula:

$$f_Z = \frac{n \cdot V_{ref}}{2\int V_u(t)dt}$$

The output of the divider 190, $f_Z$, is not affected by signal drop-outs in the A-line. Reference to the indicator 197, which indicates the number of pulses in the signal from the region-of-interest, provides an indication of when drop-outs occur.

The value of $f_Z$ should converge. Unstable readouts of $f_Z$ from the divider 190 will indicate, by visual inspection, that an inhomogeneous region is being scanned. The circuit provides a real time indication of the value of the center frequency while a region is being scanned and thus favors interpretation and understanding of the technique.

Figure 5:
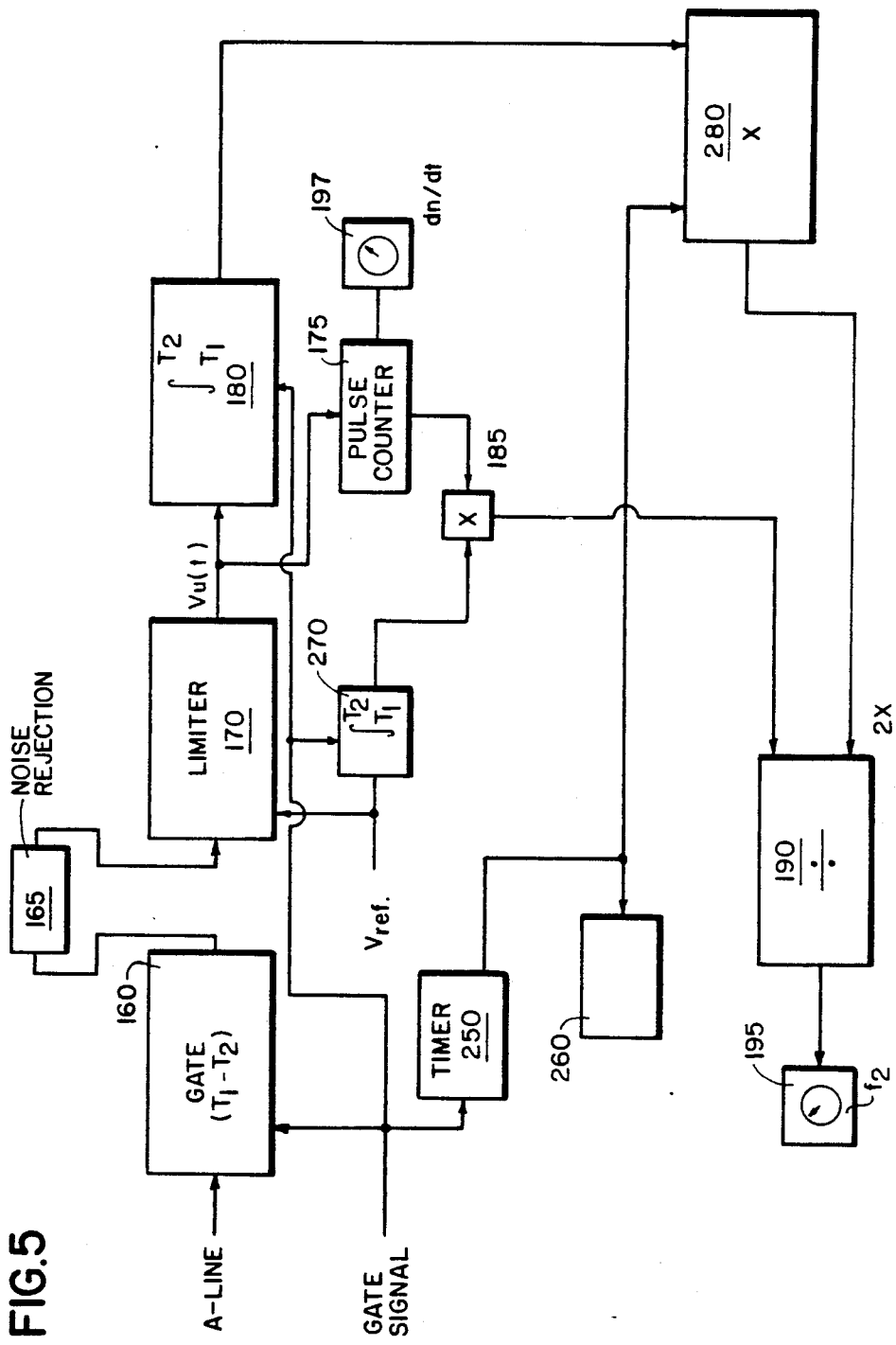
FIG. 5 is an alternate circuit which compensates for drift in the reference voltage signal.

The circuit of FIG. 5 compensates for drift in the reference voltage $V_{ref}$ by calculating the center frequency of the returned energy from the formula:

$$f_z = \frac{n}{2t} \frac{\int V_{ref}(t)dt}{\int V_u(t)dt}$$

FIG. 5 shows an alternative circuit for calculating $f_Z$ from the A-line. The gate 160, limiter 170, integrator 180, pulse counter 175, divider 190 and indicators 195 and 197 serve the same purpose as has been described with respect to FIG. 1. A timer 250 is connected to the input of gate 160 and measures the width of the gate interval $T_1-T_2$. The output of the timer 250 is indicated on a display 260. The value of $V_{ref}$ which serves as a reference for the limiter circuit 170 is integrated over $T_2-T_1$ in an integrator 270 and then applied to the input of the multiplier 185. The output of the integrator 180 is multiplied by the output of the timer 250 in a multiplier 280 and then applied to the input of the timer 190.

If desired, the sensitivity of the circuit to noise may be reduced by inserting a threshold circuit 165 between the gate 160 and the limiter 170.

The accuracy of the apparent frequency measurement depends on the statistics of the A-line signal. If desired, the statistics may be improved by accumulating the integrals and pulse count from a plurality of A-lines through the region-of-interest in integrator 180 and pulse counter 175.

I claim:

1. Apparatus for calculating the apparent frequency of ultrasound pulses-echoes in tissue in a region-of-interest in a body comprising:

means for directing pulses of ultrasound energy into the body and for detecting echoes from the region-of-interest of the energy in the form of an A-line signal;

means which gate the A-line signal and pass only portions of the A-line signal which represent echoes which originate in the region-of-interest;

limiter circuit means for converting the output of the means which gate the A-line signal into a train of pulses which have a value $V_{ref}$ whenever the A-line signal has a value above zero and which have a zero value whenever the value of the A-line signal is at or below zero;

integrator means which integrate the train of pulses;

means which count the number of pulses in the train of pulses;

means which multiply the value $V_{ref}$ by the output of the means which count the pulses; and means for dividing the output of the means which multiply by the output of the integrator means and for displaying the resultant quotient as the value of the apparent center frequency of the echoes.

2. Apparatus for indicating the apparent frequency of ultrasound pulse-echoes in a region of interest of a body comprising:

means for directing pulses of ultrasound energy into the region-of-interest of the body and for producing a gated A-line signal which represents the intensity of a series of echoes reflected in the region-of-interest;

means which convert said A-line signal into a square pulse train signal which has a value of zero whenever the instantaneous voltage of the A-line is at or below zero and which has a value of $V_{ref}$ whenever the instantaneous voltage of the A-line signal is greater than zero;

means for calculating signals representative of the ultrasound attenuation in the region of interest from the formula:

$$f_Z = \frac{n \cdot V_{ref}}{2\int V_u(t)dt}$$

wherein $V_u(t)$ represents the square wave pulse train signal, n is the number of pulses in said pulse train signal which are returned from the region of interest, and $f_Z$ is the apparent center frequency of the echoes.

3. Apparatus for calculating the apparent frequency of ultrasound pulse-echoes and tissue in a region-of-interest in a body comprising:

means for directing pulses of ultrasound energy into the body and for detecting echoes from the region-of-interest of the energy in the form of a A-line signal;

means which gate the A-line signal and pass only portions of the A-line signal which represent echoes which originate in the region-of-interest;

limiter circuit means for converting the output of the means which gate the A-line signal into a train of pulses which have a value $V_{ref}$ whenever the A-line signal has a value above zero and which have a zero value whenever the value of the A-line signal is at or below zero;

first integrator means which integrate the train of pulses;

means which count the number of pulses in the train of pulses;

second integrator means which integrate the value a reference signal $V_{ref}$;

first multiplier means which multiply the integrated value of the reference signal by the value of the output of the means which count the number of pulses;

means which measure the length of the portion of the A-line signal which represent echoes which originate in the region-of-interest;

second multiplier means which multiply the output of the first integrator means by the length of the portion of the A-line signal; and means which divide the output of the first multiplier means by the output of the second multiplier means and which display the resultant quotient as the value of the apparent center frequency of echoes originating in the region-of-interest.

* * * * *